Figure 3:
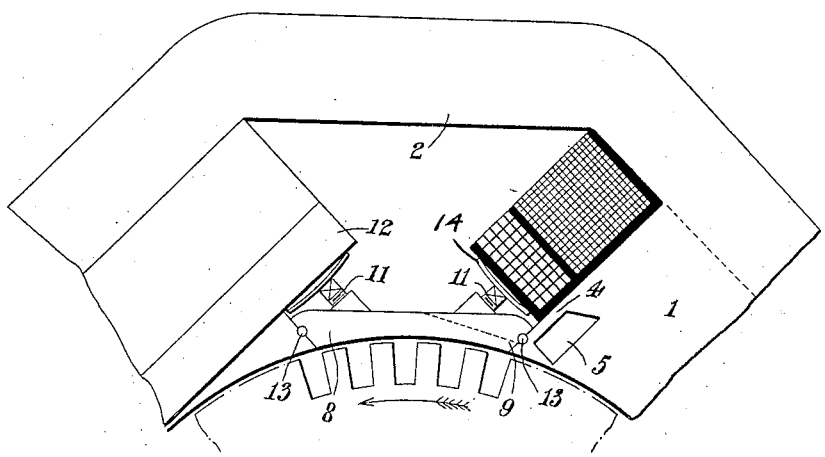

No. 880,011. PATENTED FEB. 25, 1908.
H. CHITTY.
DYNAMO ELECTRIC MACHINE.
APPLICATION FILED JUNE 2, 1904.
2 SHEETS—SHEET 1.
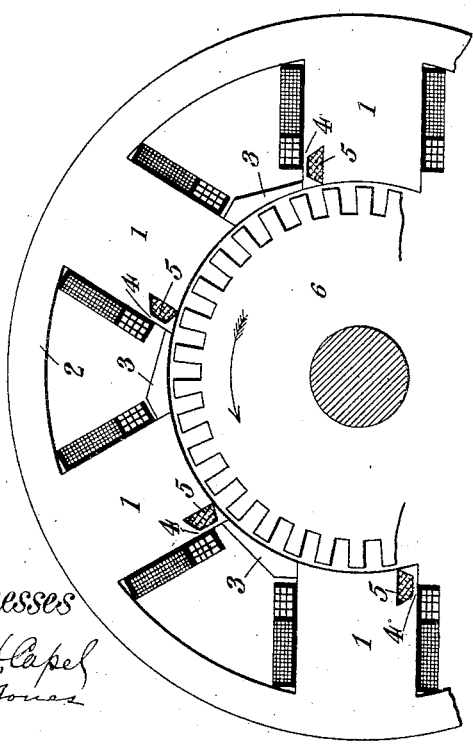
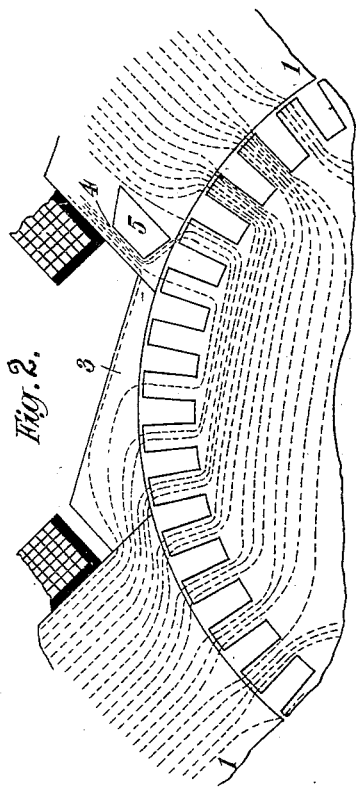

No. 880,011. PATENTED FEB. 25, 1908.
H. CHITTY.
DYNAMO ELECTRIC MACHINE.
APPLICATION FILED JUNE 2, 1904.

2 SHEETS—SHEET 2.

WITNESSES.

INVENTOR.
Henry Chitty
PER
Charles A. Terry ATTORNEY.

UNITED STATES PATENT OFFICE.

HENRY CHITTY, OF STRAND, LONDON, ENGLAND.

DYNAMO-ELECTRIC MACHINE.

No. 880,011. Specification of Letters Patent. Patented Feb. 25, 1908.

Application filed June 2, 1904. Serial No. 210,766.

*To all whom it may concern:*

Be it known that I, HENRY CHITTY, a subject of the King of Great Britain, residing at 2 Norfolk street, Strand, London, England, have invented a new and useful Improvement in Dynamo-Electric Machines, of which the following is a specification.

This invention relates to electric machines generally, such as generators, motors, rotary transformers and the like, and has for its object to provide improved means for controlling the distribution of the magnetic flux in the space embraced between the leading and trailing horns of adjacent pole pieces, so as to secure a fixed position for the brushes and sparkless commutation over a much greater range of loads than has hitherto been possible.

With this object in view, according to the present invention, a bridge piece of magnetic material is provided, extending between adjacent pole tips furnishing a shunt path for the magnetic flux. By this means, a strong magnetizing force may be concentrated upon a portion of the magnetic circuit at or near the leading horn, so that at no load this portion will be so highly saturated as to be practically incapable of any substantial increase in saturation. Hence, any additional magneto motive forces coming into play at full load, whether due to the shunt or the series windings on the poles, or to the cross magnetizing effect of the current flowing in the armature conductors, will not appreciably increase the magnetic flux at this point. For example, in a machine with the well known radial type multipolar field magnet designed to operate as a direct current generator with predetermined direction of rotation, I construct the field magnet with a bridge extending from the leading horn of one pole to the trailing horn of the next, thus forming a closed magnetic shunt circuit, in which is included a contracted neck formed in the leading side of the pole. Upon this neck, which is also in the circuit of the effective flux, at the leading horn, the combined magnetizing forces of the windings upon the two poles, acting in the closed circuit, may be concentrated.

The neck may be formed in any convenient manner as, for example, by piercing the pole in a direction transverse to the line of rotation with a suitably shaped hole extending to within a very short distance of the pole face. Such proportions in regard to length and cross section may be given to this neck, that, although a stronger magneto motive force will be acting in it than in any other portion of the magnetic circuit, raising it to a very high degree of saturation, the actual amount of flux need not be great. The bridge is made preferably of a material having good magnetic permeability;-it should have substantial cross-section towards the end where it joins the trailing horn, and the ratio between the effective and non-effective lines of force in the contracted neck may be regulated by varying the cross-section of the bridge-piece towards the end joining the leading horn. By regulating the cross-section of the bridge near the leading horn, the non-effective lines of force may be limited to a comparatively small percentage of the effective flux per pole, and the density under the leading horn kept lower than elsewhere throughout the air gap. The bridge piece is preferably pierced by ventilation passages extending in lines parallel to the direction of rotation, that is, from pole to pole, so as to offer no obstruction to the escape of air issuing from the ventilation ducts provided in the armature.

The magnet system and the armature teeth are so designed that at no load, while the flux density in the trailing side of the pole piece is low and the density in the gap underneath is high, the armature teeth will be somewhat highly saturated, and the flux on this side, becoming stronger as the load is increased, will spread out along the bridge, taking advantage of the easier path to the armature core offered through teeth less saturated than those immediately under the pole face. It will thus be seen that by the means herein described the flux on the trailing side of the pole may be made to increase and advance towards the neutral point with increase of load, while on the leading side it may be made to have a lower value and be kept approximately constant at all loads. Moreover, having a comparatively easy passage through the teeth, owing to the lower density, the flux will go straight to the armature core, instead of spreading, as is usually the case. The neutral point, and with it the line of commutation, is consequently shifted back at no load, remaining fixed, enabling a backward lead to be given to the brushes. In the case of an electric motor, the lead would be forward, instead of backward.

Figure 4:
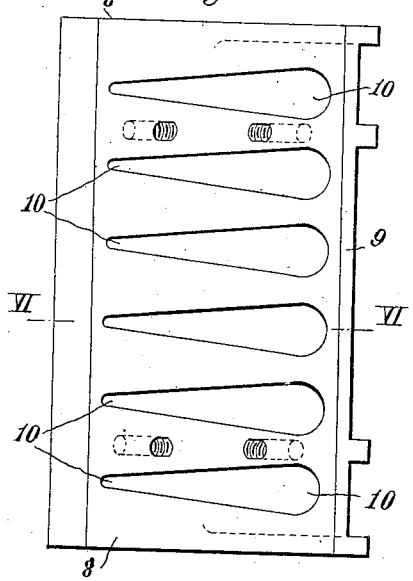
Figure 5:
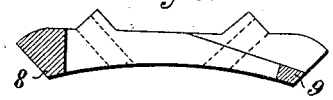

The invention is illustrated by way of example in the accompanying drawings, in which Figure 1 is a diagrammatic representation of a dynamo electric machine in which the direction of rotation is constant with my invention applied thereto. Fig. 2 is a diagram showing the distribution of the magnetic flux of such an electric machine. Fig. 3 is a view, showing one form of bridge piece in position between the poles of a dynamo electric machine. Fig. 4 is a plan of the bridge piece shown in Fig. 3, looking in an upward direction, and showing the ventilating passages provided therein. Fig. 5 is a section on the line VI.—VI. of Fig. 4.

For convenience of description, that horn or tip of the pole piece under which, in accordance with the direction of rotation, any given armature conductor last passes as it leaves the pole is herein referred to as the leading horn, and the other as the trailing horn or tip.

Referring to Fig. 1, the pole pieces of the machine are indicated at 1, and the yoke connecting them at 2. The bridge piece extending between the pole tips is shown at 3, and a contracted neck 4 is here shown as being formed in the leading side of the pole piece, by means of a hole or orifice 5 extending partly or entirely through the pole piece in a direction transverse to the direction of rotation. This contracted neck may be formed in any convenient manner as for instance by a slot which may be left open or, if desired, filled with some non-magnetic material as conventionally indicated in the slots at the right hand side of Fig. 1. The armature core is indicated at 6, and shown here as being provided with teeth 7, the direction of rotation of the armature being indicated by the arrow. The distribution of the magnetic flux while the machine is in operation is diagrammatically represented by the dotted lines in Fig. 2, the lines of force here represented being those of a generator.

A convenient form which the bridge piece may take, as applied to a machine in which the direction of rotation is constant, is illustrated in Figs. 4 and 5. At the sides 8 the shape of the bridge piece is substantially symmetrical, while the effective cross section is reduced for the greater portion of its length towards that end 9 next the leading tip of the pole piece as shown in Fig. 5. Ventilating passages 10 are provided in the body of the bridge piece, and the reduction in cross section may also be effected by making these ventilating passages to increase in  as they approach the leading tip of the  piece. Either or both of these means  y be employed f  regulating the cross section, or any other suitable means which will effect the same purpose. The bridge piece may be maintained in position by means of dowel pins or screws 13 located at the junction of the bridge and pole pieces. The bridge piece may also, if desired, be utilized to support the field coils 12 of the machine. For this purpose a plate 14 is located on the field coil and a screw 11 projecting from a lug in the bridge piece is adapted to abut against this plate. By adjusting the screw 11 the desired amount of pressure may be brought to bear on the field coil 12.

It will be obvious that the bridge piece may be formed in one with the pole pieces, if desired, and other modifications as to shape and construction both of the pole and bridge pieces may be made without departing from the spirit and scope of the invention. The invention is also not dependent upon there being windings on the poles, as an electric machine constructed in accordance with this invention is capable of operating satisfactorily as a motor without any field magnet windings whatever, the armature exciting its own field.

I claim as my invention:

1. In a dynamo electric machine having projecting pole pieces the combination with a pole piece having a portion in a direction transverse to that of rotation of the armature removed therefrom, of a bridge piece of magnetic material extending between adjacent pole pieces and forming a shunt path for the magnetic flux.

2. In a dynamo electric machine having radial pole pieces the combination with a pole piece having a portion near the polar face in a direction transverse to that of rotation of the revolving member of the machine removed therefrom, of a bridge piece of magnetic material extending between the tips of adjacent pole pieces and forming a shunt path for the magnetic flux.

3. In a dynamo electric machine having radial pole pieces the combination with a pole piece pierced with a hole in a direction transverse to that of rotation of the revolving member of the machine, of a bridge piece of magnetic material extending between adjacent pole pieces and forming a shunt path for the magnetic flux.

4. In a dynamo electric machine having projecting pole pieces the combination of a pole piece pierced with a hole in a direction transverse to that of rotation of the revolving member of the machine, of a bridge piece of magnetic material extending between the tips of adjacent pole pieces and forming a shunt path for the magnetic flux.

5. In a dynamo electric machine having projecting pole pieces the combination with a pole piece having its tip pierced with a hole in a direction transverse to that of rotation of the revolving member of the machine, of a bridge piece of magnetic material extending between adjacent pole pieces and forming a shunt path for the magnetic flux.

6. In a dynamo electric machine having radial pole pieces the combination with a pole piece the tip of which is pierced with a hole in a direction transverse to that of rotation of the revolving member of the machine, of a bridge piece of magnetic material extending between the tips of adjacent pole pieces and forming a shunt path for the magnetic flux.

7. In a dynamo electric machine having projecting pole pieces the combination with a pole piece having a portion near the leading tip in a direction transverse to that of rotation of the revolving member of the machine removed therefrom thereby forming a contracted neck in the pole piece, of a bridge piece of magnetic material extending between adjacent pole pieces and forming a shunt path for the magnetic flux.

8. In a dynamo electric machine having radial pole pieces the combination with a pole piece having a portion near the leading tip in a direction transverse to that of rotation of the revolving member of the machine removed therefrom thereby forming a contracted neck in the pole piece, of a bridge piece of magnetic material extending between the tips of adjacent pole pieces and forming a shunt path for the magnetic flux.

9. In a dynamo electric machine having projecting pole pieces the combination with a pole piece having a portion of its substance in a direction transverse to that of rotation of the revolving member of the machine and located near the polar face removed therefrom, of a bridge piece of varying cross section formed of magnetic material extending between adjacent pole pieces and forming a shunt path for the magnetic flux.

10. In a dynamo electric machine having projecting pole pieces the combination with a pole piece pierced with a hole in a direction transverse to that of rotation of the revolving member of the machine and located near the face of the pole piece, of a bridge piece of varying cross section formed of magnetic material extending between adjacent pole pieces and forming a shunt path for the magnetic flux.

11. In a dynamo electric machine having projecting pole pieces the combination with a pole piece having a portion in a direction transverse to that of rotation of the revolving member of the machine removed therefrom, of a bridge piece of varying cross section formed of magnetic material located at the extremities of adjacent pole pieces and forming a shunt path for the magnetic flux.

12. In a dynamo electric machine having radial pole pieces the combination with a pole pierced with a hole in a direction transverse to that of rotation of the revolving member of the machine, of a bridge piece of varying cross section formed of magnetic material extending between the tips of adjacent pole pieces and forming a shunt path for the magnetic flux.

13. In a dynamo electric machine having projecting pole pieces the combination with a pole piece having a portion in a direction transverse to that of rotation of the revolving member of the machine removed therefrom, of a bridge piece of magnetic material extending between adjacent pole pieces and forming a shunt path for the magnetic flux and having a greater cross section at its end which is adjacent to the trailing pole piece than at that adjoining the leading pole piece.

14. In a dynamo electric machine having projecting pole pieces the combination with a pole piece having a portion in a direction transverse to that of rotation of the revolving member of the machine removed therefrom, of a bridge piece of magnetic material located at the extremities of adjacent pole pieces forming a shunt path for the magnetic flux and having a greater cross section at its end which is adjacent to the trailing pole piece than at that adjoining the leading pole piece.

15. In a dynamo electric machine having projecting pole pieces the combination with a pole piece pierced with a hole in a direction transverse to that of rotation of the revolving member of the machine, of a bridge piece of magnetic material extending between the tips of adjacent pole pieces and forming a shunt path for the magnetic flux, said bridge piece being provided with ventilation channels.

16. In a dynamo electric machine having radial pole pieces the combination with a pole piece having a portion near the leading tip removed therefrom in a direction transverse to that of rotation of the revolving member of the machine thereby forming a contracted neck in the pole piece, of a bridge piece of magnetic material extending between adjacent pole pieces and forming a shunt path for the magnetic flux, said bridge piece being provided with ventilation ducts.

17. In a dynamo electric machine having projecting pole pieces the combination with a pole piece having a portion in a direction transverse to that of rotation of the revolving member of the machine removed therefrom, of a bridge piece of magnetic material extending between adjacent pole pieces and forming a shunt path for the magnetic flux, said bridge piece being provided with ventilation ducts in the form of slots extending in a direction from one pole piece to the next.

18. In a dynamo electric machine having projecting pole pieces the combination with a pole piece pierced with a hole in a direction transverse to that of rotation of the revolving member of the machine and located near the face of the pole piece, of a bridge piece of magnetic material extending between the extremities of adjacent pole pieces and forming a shunt path for the magnetic flux, said bridge piece being provided with ventilation channels in the form of slots extending in a direction from one pole piece to the next.

19. In a dynamo electric machine having projecting pole pieces the combination with a pole piece having a portion near the leading tip removed therefrom in a direction transverse to that of rotation of the revolving member of the machine thereby forming a contracted neck in the pole piece, of a bridge piece of magnetic material extending between adjacent pole pieces and forming a shunt path for the magnetic flux, said bridge piece being provided with ventilation ducts in the form of slots extending in a direction from one pole piece to the next.

20. In a dynamo electric machine having projecting pole pieces the combination with a pole piece having a portion removed in a direction transverse to that of rotation of the revolving member of the machine, of a bridge piece of magnetic material extending between adjacent pole pieces and forming a shunt path for the magnetic flux, said bridge piece being provided with ventilation channels in the form of slots extending in a direction from one pole piece to the next the cross section of said slots increasing from the trailing to the leading pole tip.

21. In a dynamo electric machine having projecting pole pieces the combination with a pole piece having a hole piercing it in a direction transverse to that of rotation of the revolving member of the machine and located near the polar face, of a bridge piece of magnetic material extending between the tips of adjacent pole pieces and forming a shunt path for the magnetic flux, said bridge piece being provided with ventilation ducts in the form of slots extending in a direction from one pole piece to the next the cross section of said slots increasing from the trailing to the leading pole tip.

22. In a dynamo electric machine having radial pole pieces the combination with a pole piece having portions removed near the leading tip in a direction transverse to that of rotation of the revolving member of the machine forming a contracted neck in the pole piece, of a bridge piece of magnetic material extending between adjacent pole piece and forming a shunt path for the magnetic flux, said bridge piece being provided with ventilation ducts in the form of slots extending in a direction from one pole piece to the next the cross section of said slots increasing from the trailing to the leading pole tip.

23. In a dynamo electric machine having projecting pole pieces the combination with a pole piece having portions in a direction transverse to that of rotation of the revolving member of the machine removed therefrom, of a bridge piece of magnetic material having its cross section greater at that end adjacent to the trailing pole tip than at that end adjoining the leading pole tip, said bridge piece extending between adjacent pole pieces forming a shunt path for the magnetic flux and being provided with ventilation ducts in the form of slots extending in a direction from one pole piece to the next the cross section of said slots increasing from the trailing to the leading pole tip.

24. In a dynamo electric machine having radial pole pieces the combination with a pole piece pierced with a hole in a direction transverse to that of rotation of the revolving member of the machine, of a bridge piece of magnetic material having its cross section greater at that end adjacent to the trailing pole tip than at that end adjoining the leading pole tip said bridge piece extending between adjacent pole pieces forming a shunt path for the magnetic flux, and being provided with ventilation ducts in the form of slots extending in a direction from one pole piece to the next the cross section of said slots increasing from the trailing to the leading pole tip.

25. In a dynamo electric machine having projecting pole pieces the combination with a pole piece having a portion removed near the leading tip in a direction transverse to that of rotation of the revolving member of the machine and forming a contracted neck in the pole piece, of a bridge piece of magnetic material having its cross section greater at that end adjacent to the trailing pole top than at that end adjoining the leading pole tip said bridge piece extending between adjacent pole pieces forming a shunt path for the magnetic flux, and being provided with ventilation ducts in the form of slots extending in a direction from one pole piece to the next the cross section of said slots increasing from the trailing to the leading pole tip.

26. In a dynamo electric machine having projecting pole pieces the combination with a pole piece having a portion removed in a direction transverse to that of rotation of the revolving member of the machine, of a bridge piece of magnetic material extending between adjacent pole pieces and forming a shunt path for the magnetic flux, and means for maintaining said bridge piece in position.

27. In a dynamo electric machine having projecting pole pieces the combination with a pole piece having a portion removed in a direction transverse to that of rotation of the revolving member of the machine, of a bridge piece of magnetic material extending between adjacent pole pieces and forming a shunt path for the magnetic flux, and means for holding the coil surrounding the pole piece in position comprising a screw adapted to engage with the bridge piece and to abut against a plate placed on the winding around the pole piece.

In testimony whereof I have signed my name to this specification in the presence of two subscribing witnesses this 16th day of May 1904.

HENRY CHITTY.

Witnesses:
A. A. BERGNI,
W. I. SKERTEN.